March 1, 1960

K. D. SWANDER, JR 2,926,966

BRAKE SYSTEM

Filed June 4, 1958

INVENTOR.
Kenneth D. Swander, Jr.
BY
S. C. Thorpe
ATTORNEY

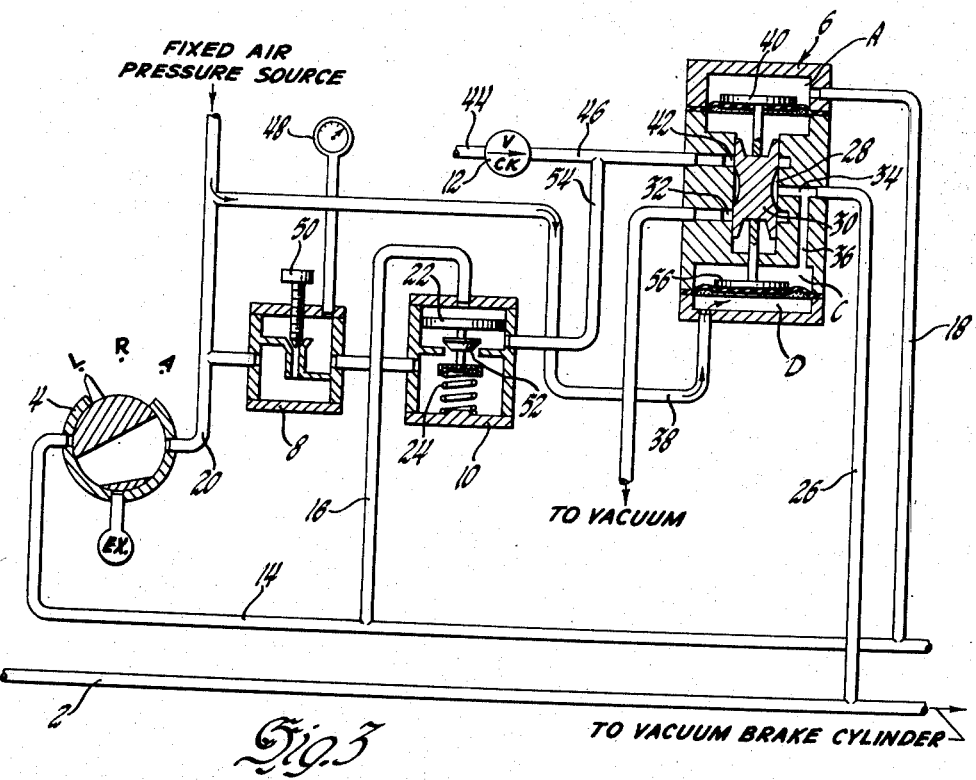

United States Patent Office

2,926,966
Patented Mar. 1, 1960

2,926,966

BRAKE SYSTEM

Kenneth D. Swander, Jr., La Grange, Ill., assignor to General Motors Corporation, Detroit, Mich., a corporation of Delaware Application June 4, 1958, Serial No. 739,785

4 Claims. (Cl. 303—46)

This invention relates generally to brake systems and more particularly to air brake systems for railway vehicles.

With the exception of the United States, where more elaborate braking systems are normally required, it is common to utilize for railway braking simple types of vacuum brake systems which rely on atmospheric pressure for application of the brakes. While such systems are normally satisfactory for applying the brakes of the relatively light weight trains used in most foreign countries, such systems become less effective when operating in mountainous country where, due to high altitudes, there is a decrease in atmospheric pressure. Most of the locomotives produced in the United States for use in foreign countries include a vacuum pump in order to make such locomotives compatible with the types of vacuum brake systems used in these countries. In addition, they normally include a small compressor to operate various locomotive accessories and auxiliaries, such as horns, etc. The present invention then has been proposed which uniquely utilizes this relatively small capacity pressure source to compensate for the loss in atmospheric pressure occurring when the train is being operated at high altitudes.

For a full understanding of the invention and the objects thereof, reference may be made to the following detailed description taken in conjunction with the drawings in which:

Figure 3 is a third view of the same system but with the system shown in a lap condition.

Figure 1:
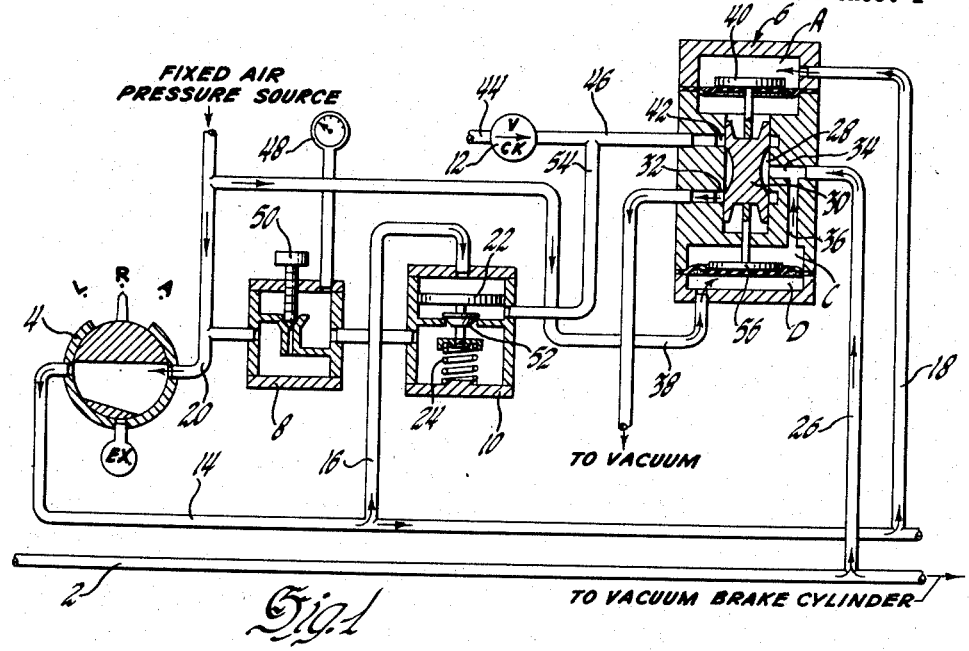
Figure 1 is a schematic diagram of a fluid vacuum brake system including the unique altitude compensating feature further showing the system in the so-called running or release condition.

Referring now to the schematic diagrams, a vacuum brake pipe 2 is shown which, in a conventional manner, runs through the locomotive and the train and has connected thereto the vacuum brake cylinders not shown. The vacuum brake cylinders may be conventional in that when they are exhausted on both sides thereof the brakes are released and when atmospheric pressure is applied to one side through the pipe 2, the brakes of the train are applied. Suitable valving is present in combination with the cylinders to accomplish this conventional function. Since the construction of such cylinders and their operation are well-known and form no part of the present invention, no further elucidation is deemed necessary herein.

Also shown is a fixed air pressure source, so labelled, and a vacuum source, also labelled. The Fixed Air Pressure Source in such a system normally constitutes a compressor and a main reservoir, neither of which have been shown, but which are conventional and well-known in railway brake systems. The source of vacuum may comprise a vacuum pump and tank combination whose construction and operation may be typical of many such combinations used in present day vacuum brake systems.

A locomotive brake valve is diagrammatically shown and indicated by a numeral 4. Also included in this system is a special control valve 6, a regulating device 8, a cut-off valve 10, and a one-way check valve 12. A control pipe 14 leading from the brake valve 4, which is normally charged in the running condition of the system is tapped into by branch pipes 16 and 18, leading to the cut-off valve 10 and the control valve 6 respectively.

Referring now particularly to Figure 1, the operation of the compensated vacuum brake system in the running position is as follows: the brake valve 4 is placed so that the indicator points to R which symbolizes the running or release position of the valve and the brake system. With the brake valve 4 in the position shown in Figure 1, the Fixed Air Pressure Source will be connected to the control pipe 14 via the piping 20. Thus the Fixed Air Pressure Source will charge the control pipe 14 and also the upper chamber A of the control valve 6 via the pipe 18. The Fixed Air Pressure Source via the pipe 20, the brake valve 4, a control pipe 14 and pipe 16 will also be connected to the upper side of piston 22 of the cut-off valve 10 causing this valve to be held on its seat against the action of the spring 24 therein. The vacuum brake pipe 2, with the brake valve in the release or running position, has been evacuated via the piping 26 leading from the vacuum brake pipe to the annular recess 28 around the movable sliding valve 30 of control valve 6. The recess 28, under balanced running condition of slide valve 30, is such that the port 32 is slightly open so that the vacuum brake pipe 2 is connected to vacuum at all times during the running or release condition of the system to thereby compensate for any leakage or tendency to loss of vacuum in the brake pipe 2. It will be noted that a chamber C in control valve 6 is connected to port 34 and piping 26 via passage 36 in the control valve 6 so that chamber C is also under the same vacuum as in the vacuum brake pipe 2. Chamber D of the control valve 6 is connected to the Fixed Air Pressure Source via pipe 38. With the brake valve 4 in the position shown, the flow of air pressures in the system is generally indicated by the direction of the arrows.

Figure 2:
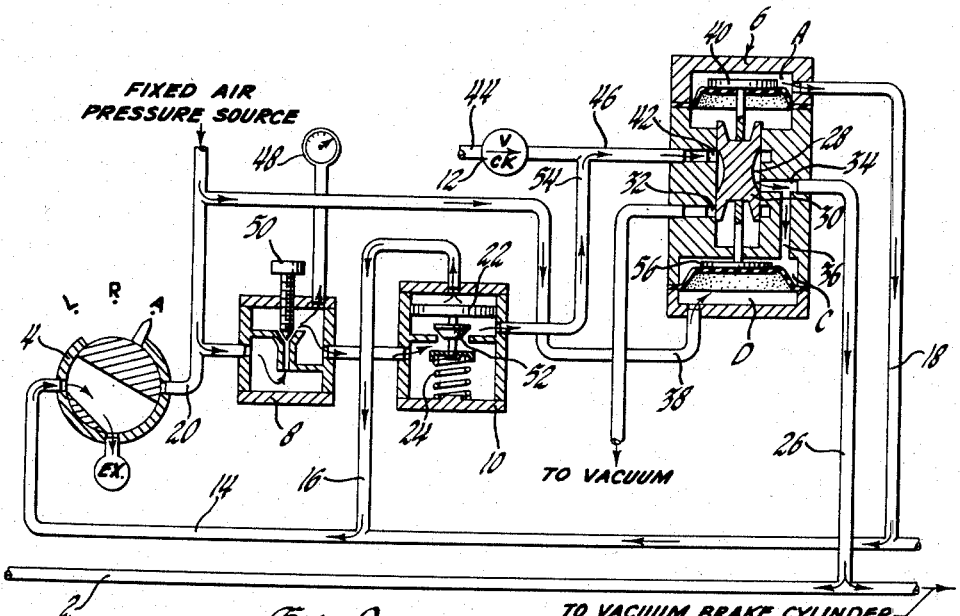
Figure 2 is a second view of the same system but showing the system in the application condition.

If the engineer decides to make a brake application, he will move the brake valve 4 to the position A as shown in Figure 2. The brake valve will then connect the control pipe 14 to the exhaust port EX in the brake valve 4 and, at the same time, disconnect the control pipe 14 from the Fixed Air Pressure Source. By moving the brake valve to the brake application position A and exhausting a portion of the air in control pipe 14, its pressure will be reduced resulting in a loss of pressure in pipe 18 and in chamber A of control valve 6. Because of the vacuum at the time in chamber C, and the fixed pressure in chamber D of control valve 6, the diaphragm piston 40 and the slide valve 30 will move upwardly causing the annular clearance 28 to connect ports 34 and 42 together. Atmospheric air may now flow from the atmospheric port 44 through the one-way check valve 12 and piping 46 into the piping 26 and vacuum brake pipe 2 thereby causing an application of the brakes.

It will be appreciated, however, that assuming the train to be operating at a high altitude, in for example mountainous country, the difference in pressure across the pistons of the vacuum brake cylinders is limited to the atmospheric pressure at that particular altitude which may not be sufficient to control the momentum of the train particularly when operating on some of the relatively steep down grades encountered under such conditions. To compensate for this loss in brake applying pressures, the present invention has been provided.

Continuing to refer to Figure 2, it will be observed that the system also includes an altitude pressure indicator 48 which the engineer or operator can use as a guide to compensate for the loss of pressure due to altitude. The engineer may adjust the needle valve 50 to compensate for this loss of pressure due to altitude by allowing a certain amount of air from the Fixed Air Pressure Source to flow through the regulator 8 to the cut-off valve 10. The cut-off valve 10, however, is now open because the lower pressure in the control pipe 14 and pipe 16 caused by connecting them to the exhaust of the brake valve 4 in turn causes a reduction in pressure on the upper face of the piston 22 of the cut-off valve 10. The spring 24 of the cut-off valve 10 opens the valve 52 of cut-off valve 10 and connects the Fixed Air Pressure Source via piping 54 and 46 and ports 42 and 34 now connected by slide valve 30 and piping 26 to the vacuum brake pipe 2. Thus, the atmospheric pressure entering port 44 through the check valve 12 is supplemented by the regulated air pressure from the Fixed Air Pressure Source and in this way full braking may be achieved regardless of the altitudes at which the vacuum brakes are being used. The one-way check valve 12, is of course, for the purpose of preventing the loss of any compensating air from the Fixed Air Pressure Source through the port 44.

If, after the engineer has made a brake application, he wishes to maintain the magnitude thereof, the brake valve 4 is moved to the L or lap position. (See Figure 3.) By moving the brake valve 4 to the L or lap position, the control pipe 14 is disconnected from exhaust EX of brake valve 4 thereby stopping any further pressure reduction therein. This lower pressure in control pipe 14, as already mentioned, is reflected in chamber A of control valve 6. However, since, as was previously mentioned, the vacuum brake pipe 2 has been connected to atmosphere as well as the Fixed Air Pressure Source via the ports 42 and 34, air is not only supplied to the vacuum brake pipe 2, but to the chamber C as well, thus causing the pressure to build up in chamber C. This building up of pressure in chamber C, once the control pipe 14 is no longer exhausting, causes the diaphragm piston 56 and slide valve 30 to move downwardly just far enough to disconnect the ports 42 and 34 and, at the same time, to maintain the vacuum brake pipe 2 and piping 26 disconnected from the source of vacuum. In this way, the brakes are held applied until it is desired to release them, at which time the brake valve 4 is moved to the running or released position R as shown in Figure 1. Movement of the brake valve 4 to the running or released position R again connects the control pipe 14 to the Fixed Air Pressure Source causing the pressure to rise in the control pipe 18 and also in chamber A of control valve 6. As the pressure rises in chamber A, and because of the pressure now present in chamber C of the control valve, the diaphragm pistons 40 and 56 cause the slide valve 30 to move downwardly, again connecting ports 32 and 34 together via the annular recess 28. Connection of ports 32 and 34 together connects the vacuum brake pipe 2 to vacuum and again evacuates it to release the brakes. Also, by again increasing the pressure in control pipe 14, pressure is increased in the pipe 16 and on the upper face of piston 22 of the cut-off valve 10 thereby disconnecting the compensating pressure from the piping 54 leading to the control valve 6.

From the foregoing description, it may now be appreciated that a unique vacuum brake system, which compensates for changes in atmospheric pressure, has been set forth to enable full braking to be achieved regardless of the altitude at which the system may be operated.

I claim:

1. In a brake system including a fluid pressure source, a vacuum source and a brake pipe which when evacuated releases and when pressurized applies the brakes of said system, means for compensating for changes in atmospheric pressure used to apply the brakes of said system comprising valve means between the atmosphere and said pipe operable to connect the atmosphere to said pipe, said pipe operable to connect the atmosphere to said pipe, secondary valve means between said pressure source and said pipe operable to connect said pressure source to said pipe and thereby supplement the atmospheric pressure supplied to said pipe.

2. In a train brake system, a brake pipe which when evacuated releases and when pressurized applies the brakes of said system, a vacuum source and a pressure source, valve means between the atmosphere and said pipe operable to supply atmospheric pressure to said pipe, and secondary valve means between said pressure source and said pipe operable to supplement the atmospheric pressure supplied to said pipe.

3. In an air brake system a vacuum brake pipe which when evacuated releases and when pressurized applies the brakes of said system, a vacuum source, an air pressure source, valve means operable to connect said vacuum source to said pipe during running or brake release condition of said system, valve means operable to disconnect said vacuum source from said pipe and connect said pipe to atmospheric pressure to effect a brake application condition of said system, and valve means operable during a brake application condition of said system to connect said pressure source to said pipe to supplement the atmospheric pressure supply to said pipe.

4. In an air brake system including a brake pipe which when evacuated releases the brakes of said system and which when pressurized applies the brakes of said system, a vacuum source, an air pressure source, first valve means having a brake release position operable to connect said pipe to said vacuum source, said first valve means having a brake application position operable to disconnect said pipe from said vacuum source and connect said pipe to atmospheric pressure, said valve means including secondary valve means being operable when said first valve means is in said application position to connect said pressure source to said pipe to supplement the atmospheric pressure applied to said pipe, and metering means between said pressure source and said secondary valve means adjustable to regulate the air pressure supplied from said source to said pipe.

References Cited in the file of this patent

UNITED STATES PATENTS 2,822,220   May ------------------ Feb. 4, 1958

UNITED STATES PATENT OFFICE
CERTIFICATE OF CORRECTION

March 1, 1960

Patent No. 2,926,966

Kenneth D. Swander, Jr.

It is hereby certified that error appears in the printed specification of the above numbered patent requiring correction and that the said Letters Patent should read as corrected below.

Column 4, line 49, after "means" strike out "being".

Signed and sealed this 13th day of September 1960.

(SEAL)
Attest:

KARL H. AXLINE
Attesting Officer

ROBERT C. WATSON
Commissioner of Patents